J. C. BARBER.
ROLLER BEARING DEVICE FOR CAR TRUCKS.
APPLICATION FILED JUNE 27, 1912.
1,044,847.
Patented Nov. 19, 1912.
2 SHEETS—SHEET 2.
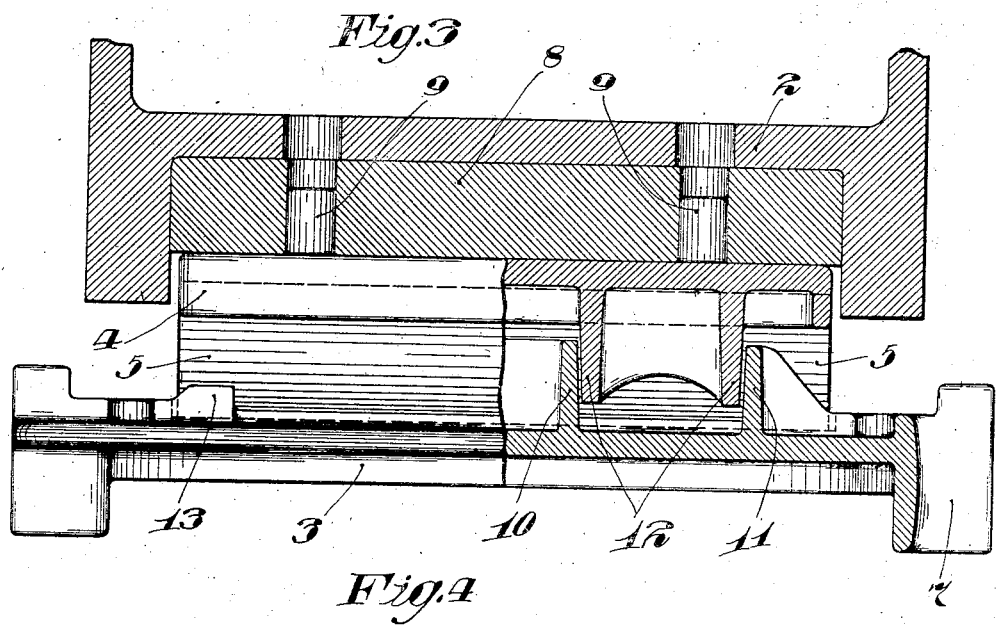
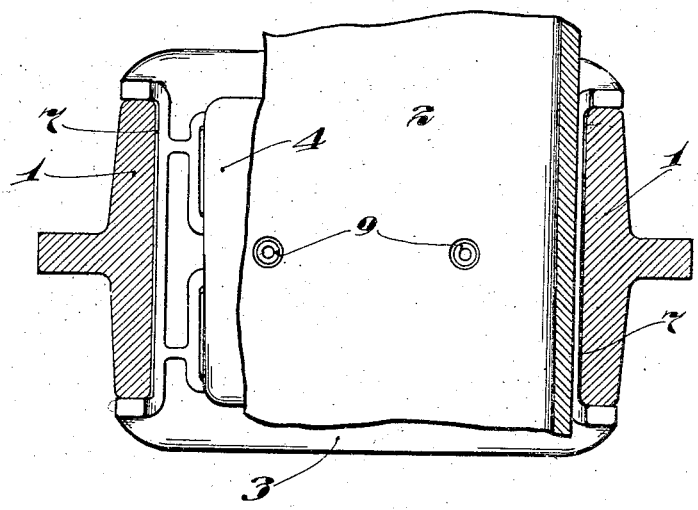
Witnesses:
Geo. Knutson
A. H. Opsahl.
Inventor;
J. C. Barber
By his Attorneys;
Williamson & Merchant

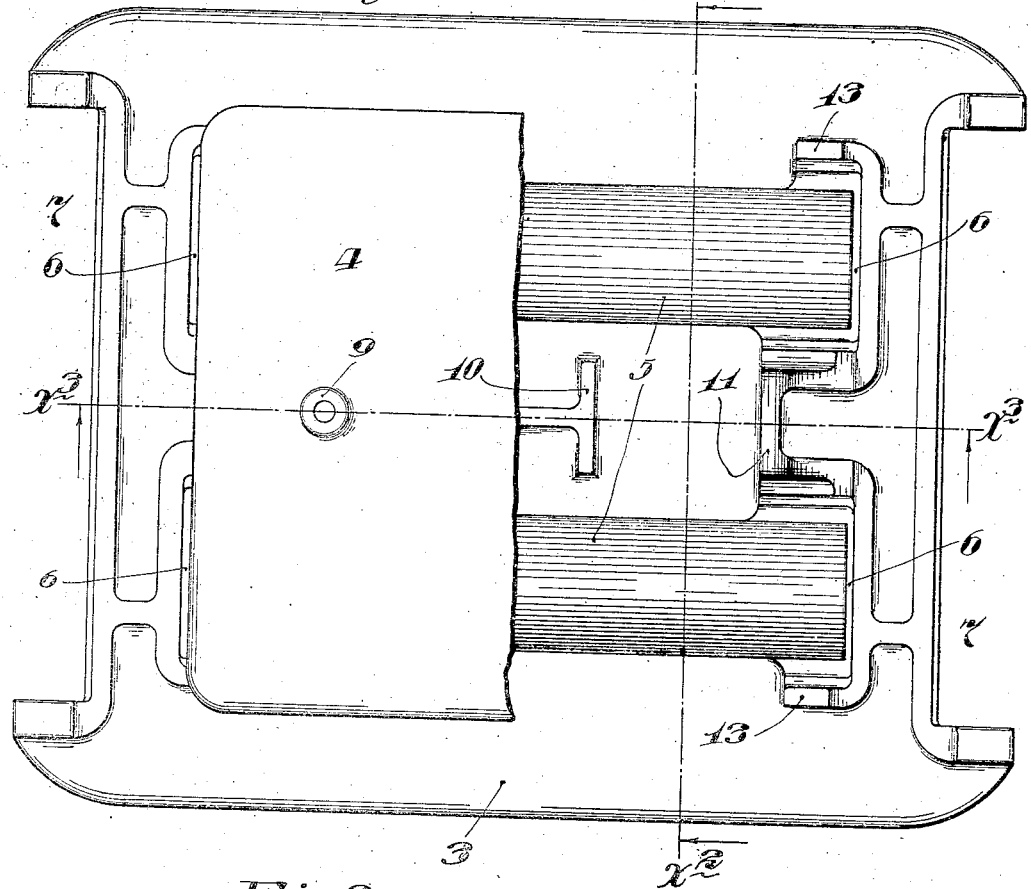
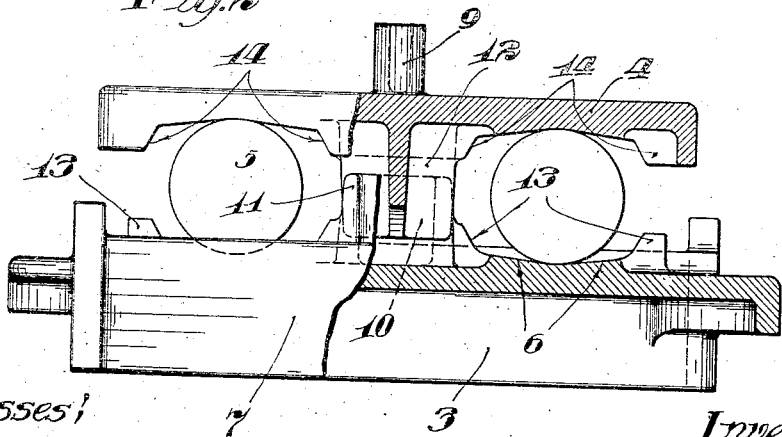

UNITED STATES PATENT OFFICE.

JOHN C. BARBER, OF CHICAGO, ILLINOIS, ASSIGNOR TO STANDARD CAR TRUCK COMPANY, OF CHICAGO, ILLINOIS, A CORPORATION OF NEW JERSEY.

ROLLER-BEARING DEVICE FOR CAR-TRUCKS.

1,044,847.

Specification of Letters Patent.

Patented Nov. 19, 1912.

Application filed June 27, 1912. Serial No. 706,259.

*To all whom it may concern:*

Be it known that I, JOHN C. BARBER, a citizen of the United States, residing at Chicago, in the county of Cook and State of Illinois, have invented certain new and useful Improvements in Roller-Bearing Devices for Car-Trucks; and I do hereby declare the following to be a full, clear, and exact description of the invention, such as will enable others skilled in the art to which it appertains to make and use the same.

My invention has for its particular object the improvement of roller bearing devices for lateral motion trucks, and especially those wherein the truck bolster is supported by such roller bearing devices for endwise movements transversely of the truck.

Generally stated, the invention consists of the novel construction and arrangement of parts hereinafter described and defined in the claims.

Hitherto, in roller bearing devices of the above noted character, it has been the practice to mount the rollers in recessed seats formed in the coöperating upper and lower roller bearing plates and to rely on this engagement with the ends of the rollers with their seats to hold the truck bolster, to which the upper bearing plates are secured against sliding movements longitudinally of the rollers. In practice, it has been found that, with the above noted prior construction, there will, nevertheless, be some sliding movement of the top plate on the rollers and this sliding, in some cases, has allowed the sides of the bolster to wear and eat into the coöperating columns.

I have found that the above objectionable wear may be overcome by providing the upper and lower bearing plates with coöperating interlapping wearing flanges or lugs, which permit free movements of the rollers and upper bearing plates transversely of the truck, but which hold the sides of the bolster out of engagement with the columns. Also, I have found that, by forming the upper and lower bearing plates with stop lugs for engagement with the rollers, the endwise travel of the bolster may be limited without requiring stop lugs on the truck bolster for engagement with the columns. This latter feature is highly important, because it has been found, in many cases, that the openings in the side frames of the trucks do not permit truck bolsters with lateral projecting bolster engaging stop lugs to be applied to the trucks.

In the accompanying drawings which illustrate my invention, like characters indicate like parts throughout the several views.

Referring to the drawings, Figure 1 is a plan view of the improved roller bearing, some parts being broken away; Fig. 2 is a view partly in elevation and partly in section on the line $x^2$ $x^2$ of Fig. 1; Fig. 3 is a transverse section taken on the line $x^3$ $x^3$ of Fig. 1, some parts being shown in full; and Fig. 4 is a horizontal section, taken through the columns and bolster of the truck, and showing the improved side bearing applied thereto, some parts being broken away.

The columns 1 of the truck side frame may be of the usual or any suitable construction, and the same statement is true in respect to the truck bolster 2; the said truck-bolster, however, is not provided with stop lugs for engagement with the said columns, its endwise movements transversely of the truck being limited in the manner already indicated.

The numerals 3 and 4 indicate, respectively, the upper and lower roller bearing plates, and the numeral 5 indicates the interposed lateral motion rollers, which latter work in depressed roller seats 6, preferably, having flat surfaces diverging from the intermediate portions of the said roller seats in a direction longitudinally of the truck bolster. The lower roller bearing plate 3, as illustrated, is designed for use as a combined spring cap and roller bearing adapted to be supported from the truck side frame by suitable springs, not shown, and, in its ends having large notches 7 adapting it to slide vertically on the columns 1.

The ends of the truck bolster 2, as shown, rest directly upon shimming blocks 8 which, in turn, are secured to the respective upper bearing plates 4, as shown, by means of dowel pins 9. Obviously, the upper bearing plates 4 and shimming blocks move with the truck bolster transversely of the truck.

In accordance with my invention, preferably designed, the lower bearing plate 3 on its upper face is provided with intermediate wearing lugs or flanges 10 and end or outer wearing lugs or flanges 11, and the upper bearing plate 4 is provided with depending wearing flanges or lugs 12 that work between the wearing lugs or flanges 10 and 11 of the said lower bearing plate. The engaging surface of the said wearing flanges 10, 11 and 12 extend parallel to each other, longitudinally of the truck bolster which is at a right angle to the axes of the rollers 5; and all of the said wearing flanges are located between the two rollers 5. Preferably, the clearance between the wearing flanges 10, 11 and 12 is such that the ends of the rollers will not be forced into engagement with the outer extremities of the roller seats 6, but, in some instances, the arrangement may be such that the said wearing flanges will be engaged simultaneously with the engagement with the ends of the rollers with the ends of the said seats. This clearance or play, however, should be such that the sides of the truck bolster 2 will be held out of engagement with the inner faces of the columns 1, and, hence, wear between said bolster and columns is prevented. In the arrangement illustrated, the extremities of the wearing flanges 10, 11 and 12 operate as stops and engage the inner sides of the rollers to limit the endwise travel of the bolster transversely of the truck, and, for coöperation therewith, the upper and lower bearing plates outside of their roller seats 6 are formed with roller engaging stop lugs 13 and 14, respectively. With this arrangement of stop lugs and flanges, the rollers 5 can travel in any direction until one of the rollers strikes the outside stop lug 13, and the other roller strikes the flanges 10 and 11 of the lower bearing plate, and the upper bearing plate can travel in the same direction until its flanges 12 strike one of the rollers and the stop lug 14 on one side thereof strikes the other roller. In this way, as is evident, the lateral travel of the truck bolster is limited without the use of stop lugs or stop devices of any kind on the bolster and columns.

The construction described, while extremely simple and cheap to make, has, in practice, been found highly efficient in railroad services.

What I claim is:—

1. A roller bearing device comprising upper and lower bearing plates and interposed rollers, said bearing plates having coöperating interlapped wearing surfaces extended transversely of said rollers and located inward of the ends of said rollers.

2. A roller bearing device comprising upper and lower bearing plates and interposed rollers, said bearing plates having coöperating interlapped wearing surfaces extended transversely of said rollers, and the said bearing plates having coöperating roller engaging stops for limiting the travel of the one bearing plate in respect to the other.

3. The combination with truck frame columns and a truck bolster, of a coöperating roller bearing device comprising upper and lower bearing plates and interposed rollers, said bearing plates having coöperating interlapped wearing flanges extended transversely of said rollers and longitudinally of said bolster.

4. The combination with bolster columns and a truck bolster, of a coöperating roller bearing device comprising upper and lower bearing plates and interposed rollers, said bearing plates having coöperating interlapped wearing flanges extended transversely of said rollers and longitudinally of said bolster, said bearing plates also having coöperating roller engaging stops for limiting the travel of said upper bearing plate and bolster on said rollers.

5. A roller bearing device comprising upper and lower bearing plates and interposed rollers, said bearing plates having coöperating interlapped wearing surfaces extended transversely of said rollers, the said coöperating wearing flanges being located between said rollers.

6. The combination with bolster columns and a truck bolster, of a coöperating roller bearing device comprising upper and lower bearing plates and interposed rollers, said bearing plates having coöperating interlapped wearing flanges extended transversely of said rollers and longitudinally of said bolster, the said coöperating wearing flanges being located between said rollers.

7. The combination with bolster columns and a truck bolster, of a coöperating roller bearing device comprising upper and lower bearing plates and interposed rollers, said bearing plates having coöperating interlapped wearing flanges extended transversely of said rollers and longitudinally of said bolster, said bearing plates also having coöperating roller engaging stops for limiting the travel of said upper bearing plate and bolster on said rollers, the said bolster being free from stop lugs or projections engageable with said columns.

In testimony whereof I affix my signature in presence of two witnesses.

JOHN C. BARBER.

Witnesses:
F. L. BARBER,
ELENOR ORR.